United States Patent
Aufiero

(10) Patent No.: US 12,146,463 B2
(45) Date of Patent: Nov. 19, 2024

(54) POWER PRODUCTION SYSTEM

(71) Applicant: SIZABLE ENERGY S.R.L., Milan (IT)

(72) Inventor: Manuele Aufiero, Milan (IT)

(73) Assignee: SIZABLE ENERGY S.R.L., Milan (IT)

( * ) Notice: Subject to any disclaimer, the term of this patent is extended or adjusted under 35 U.S.C. 154(b) by 0 days.

(21) Appl. No.: 18/039,796

(22) PCT Filed: Nov. 24, 2021

(86) PCT No.: PCT/IB2021/060911
§ 371 (c)(1),
(2) Date: Jun. 1, 2023

(87) PCT Pub. No.: WO2022/118143
PCT Pub. Date: Jun. 9, 2022

(65) Prior Publication Data
US 2024/0011455 A1    Jan. 11, 2024

(30) Foreign Application Priority Data

Dec. 1, 2020   (IT) .................. 102020000029351

(51) Int. Cl.
*F03B 13/06* (2006.01)
*F03B 15/00* (2006.01)

(52) U.S. Cl.
CPC ............ *F03B 13/06* (2013.01); *F03B 15/005* (2013.01); *F03B 15/00* (2013.01); *F05B 2260/42* (2013.01); *F05B 2270/337* (2013.01)

(58) Field of Classification Search
CPC ........ F03B 13/06; F03B 15/00; F03B 15/005; F05B 2270/337; F05B 2260/42
See application file for complete search history.

(56) References Cited

U.S. PATENT DOCUMENTS

| 1,493,154 A | * | 5/1924 | Harza | ..................... F03B 11/02 |
| | | | | 60/696 |
| 4,754,155 A | * | 6/1988 | Obermeyer | ............. F03B 15/00 |
| | | | | 415/131 |

(Continued)

FOREIGN PATENT DOCUMENTS

| DE | 102018107225 | * | 3/2018 | ............. F03B 13/06 |
| DE | 102018107225 B3 | | 6/2019 | |

(Continued)

OTHER PUBLICATIONS

PCT International Search Report and Written Opinion dated Jan. 27, 2022 for PCT Application No. PCT/IB2021/060911.

*Primary Examiner* — Dustin T Nguyen
(74) *Attorney, Agent, or Firm* — McCarter & English, LLP

(57) ABSTRACT

A power production system is provided that includes: a hydraulic turbine, installable in a penstock and being rotatable in a first rotation direction by effect of a flow of fluid flowing in the penstock in a downward direction; an energy converter group; an accumulator; a control unit, configured to operate the system in a power generation mode, in which the energy converter group receives an input mechanical power from the hydraulic turbine rotating in the first rotation direction, generates an output electric power and supplies said output electrical power to an external grid and/or to the accumulator, and in a downward pushing mode, in which the energy converter group absorbs an input electrical power from the accumulator and generates an output mechanical power to move the hydraulic turbine.

19 Claims, 6 Drawing Sheets

(56) References Cited

U.S. PATENT DOCUMENTS

| | | | | |
|---|---|---|---|---|
| 8,899,873 B2* | 12/2014 | Igel, V | ................... | F03B 13/06 |
| | | | | 405/53 |
| 9,494,127 B2* | 11/2016 | Hongawa | ............... | F03B 13/06 |
| 10,487,794 B2* | 11/2019 | Barg | ...................... | F03B 15/04 |
| 10,947,961 B2* | 3/2021 | Brown | ...................... | F03D 9/12 |
| 11,274,648 B2* | 3/2022 | Sankrithi | ............... | F03B 15/02 |
| 11,359,597 B2* | 6/2022 | Olson | .................... | F28D 1/022 |
| 11,846,263 B2* | 12/2023 | Medina | ................. | F03B 13/06 |
| 2019/0331084 A1* | 10/2019 | Fridrich | ................. | F03B 13/06 |

FOREIGN PATENT DOCUMENTS

| | | | | |
|---|---|---|---|---|
| EP | 2818692 A1 | 12/2014 | | |
| WO | WO 2005/073550 A1 | 8/2005 | | |
| WO | WO 2005073550 | * 8/2005 | ............ | F03B 15/005 |
| WO | WO 2019/207564 A1 | 10/2019 | | |

* cited by examiner

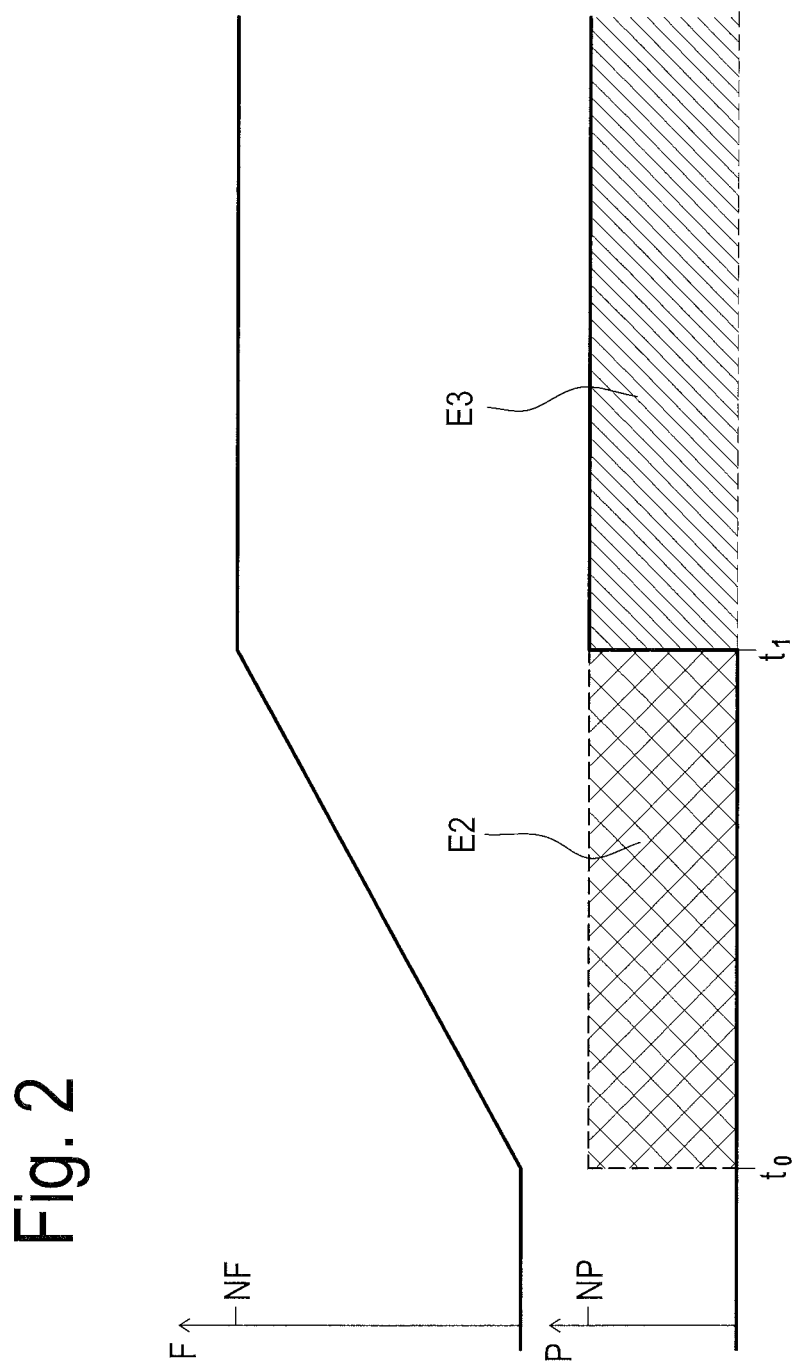

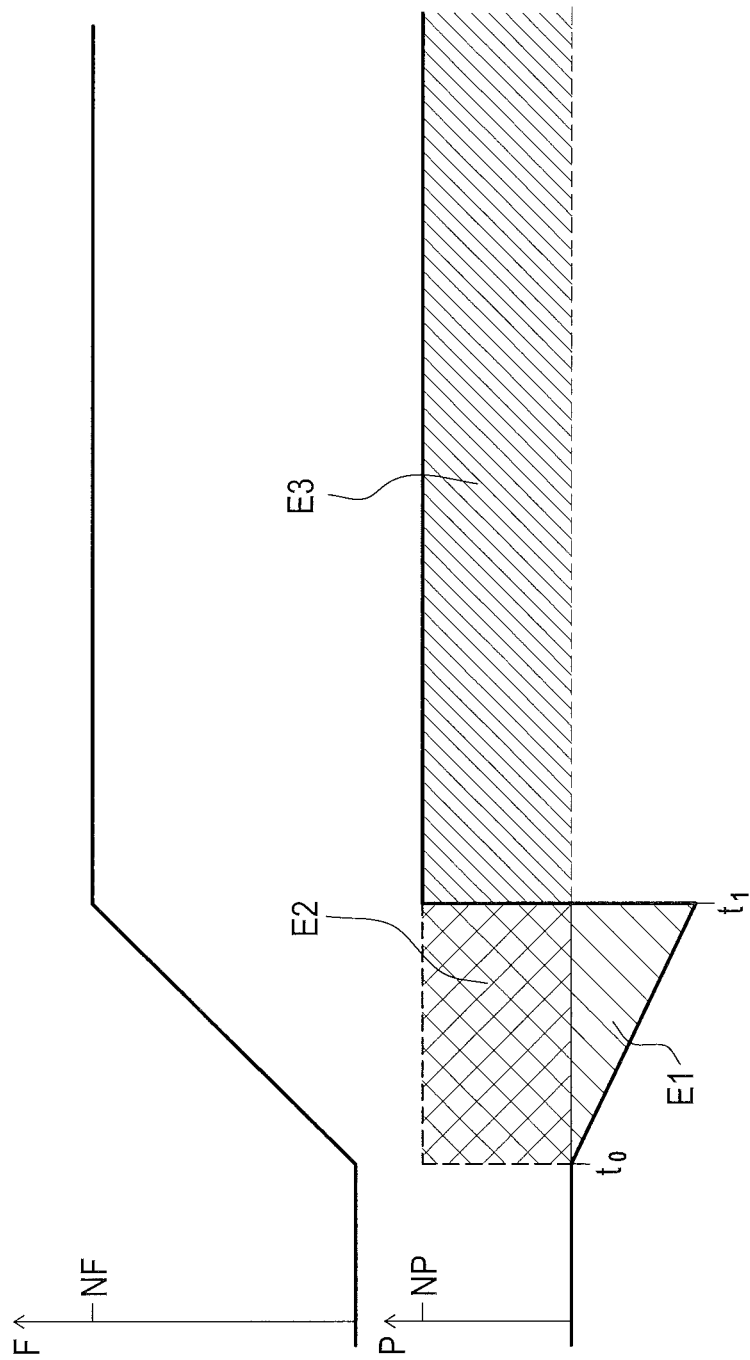

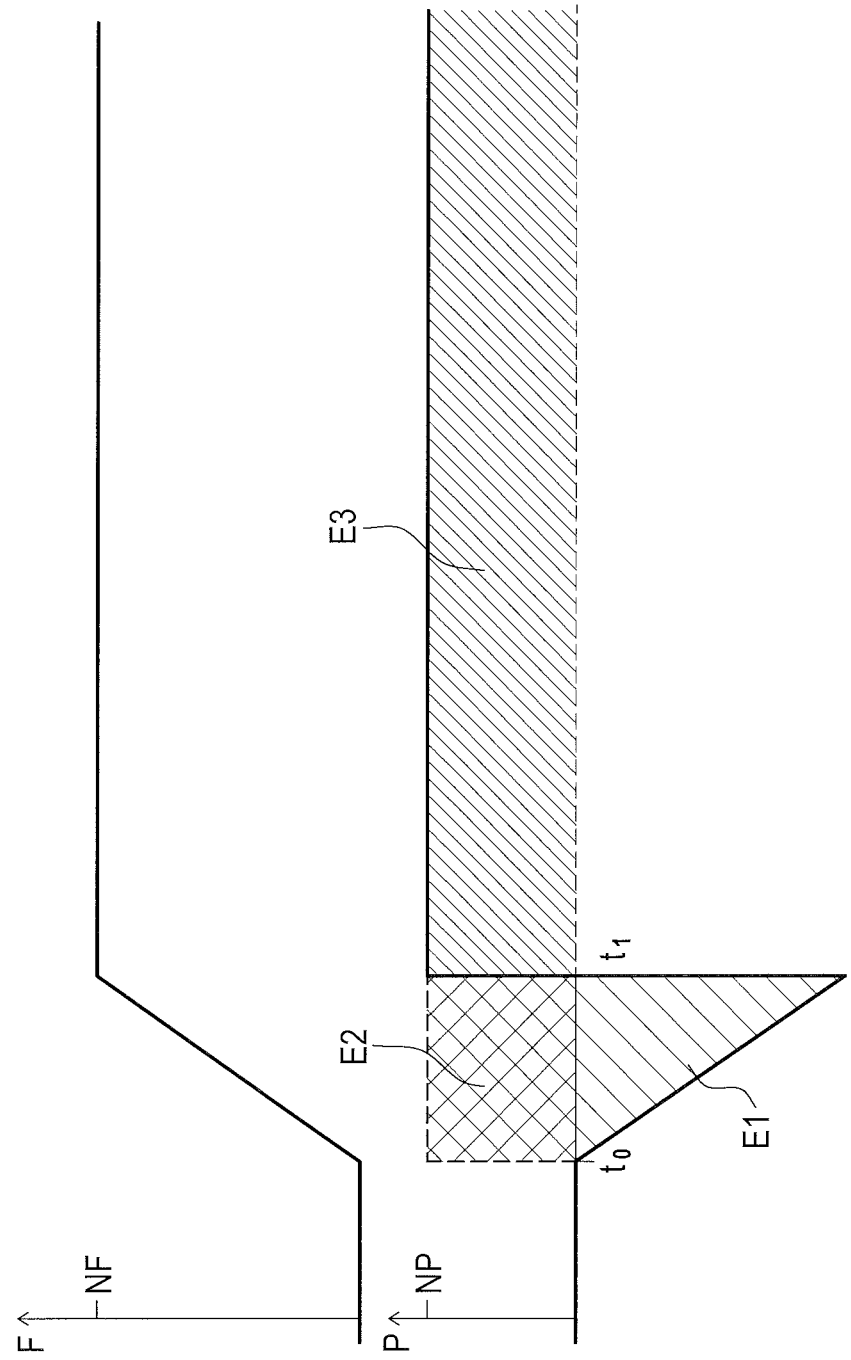

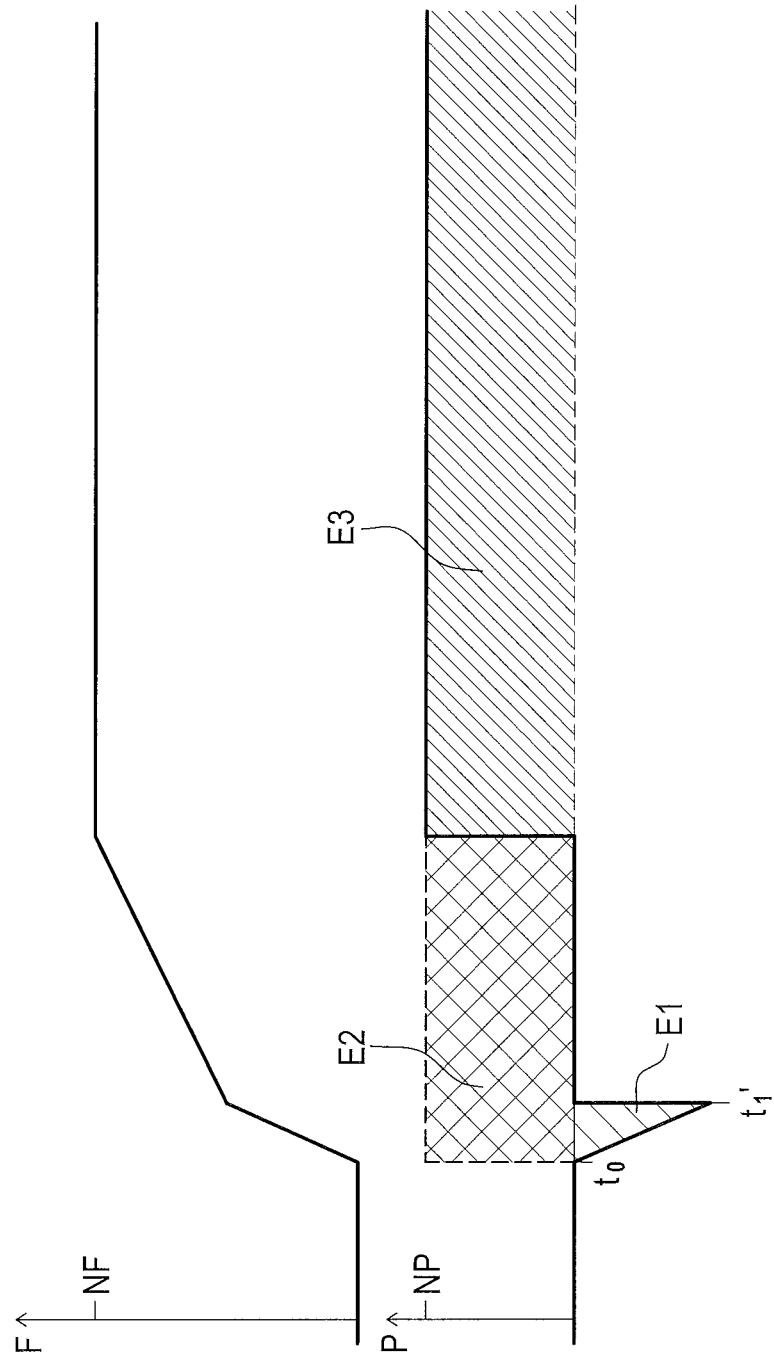

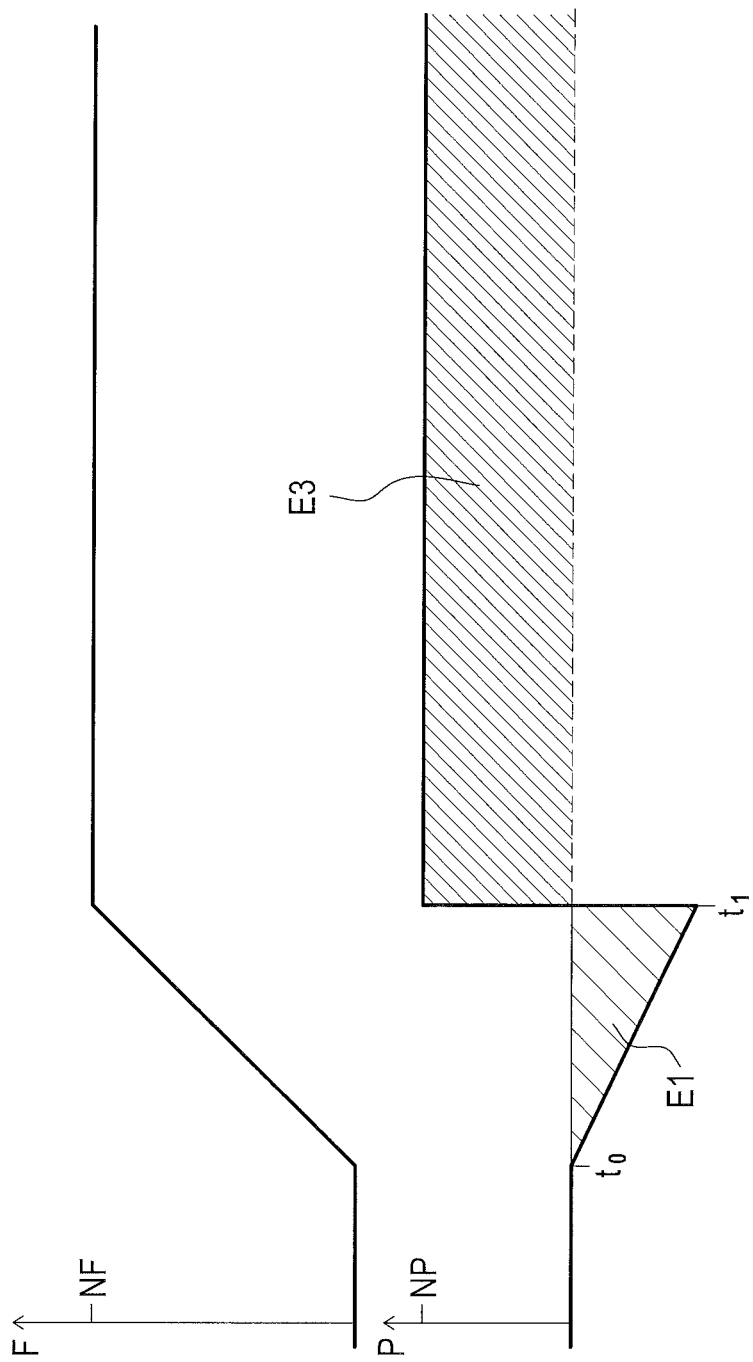

POWER PRODUCTION SYSTEM

CROSS-REFERENCE TO RELATED APPLICATIONS

This patent application is a 35 U.S.C. § 371 National Stage filing of International Application No. PCT/IB2021/060911, filed on Nov. 24, 2021, which application claims priority from Italian Patent Application No. 102020000029351, filed on Dec. 1, 2020, the entire disclosures of which are incorporated herein by reference.

TECHNICAL FIELD

This invention relates to a power production system, to a power plant and to a method for managing a power production system.

BACKGROUND ART

In the technical field of power production systems, pumped storage hydraulic power plants including a first and a second reservoir being at different heights are known, e.g. from patent documents WO2019207564, FR3011885. During periods of surplus electrical power production in the grid, the electricity is used to pump the water upstream from the lower reservoir to the higher reservoir, while during periods of electrical power demand from the grid, the water is allowed to flow downstream from the higher reservoir to the lower reservoir via a turbine that is coupled to an electrical generator. However, upon a request of electrical power from the grid, the system takes time to reach the output level of electrical power to be supplied to the grid; this time is due to time required for the turbine to reach the operating speed and for the water flow in the penstock to reach the flow rate required for the operational regime.

Recently, large penetration of renewable energy sources and distributed generating systems requires a more flexible operation of the electric grid; so, new, highly valued grid services are being introduced in electricity markets. For example, Fast Frequency Response and Synthetic Inertia are new grid services that envisage power systems responding to grid frequency perturbations by increasing or decreasing the power consumption or production within a few hundred milliseconds from a signal or frequency event. In this context, traditional pumped storage hydraulic power plants, which often require startup times in the order of tens of seconds or few minutes, are not adequate for shorter response time services.

In order to shorten the response time, patent document WO2019207564 discloses a pumped-storage hydraulic system coupled to a capacitor array; the capacitor array is configured to supply electrical power to the grid by discharging until electrical power recovered from the pumped-storage hydraulic system is suitable for input to the grid. Thus, after a frequency event or grid signal, the capacitor array provides the required power to the grid from a few hundred milliseconds from the event, up to the complete startup of the hydro system. This way, the system is able to respond quickly. However, this system requires a high energy storage capacity in the capacitor array, in order to effectively provide grid services. High energy storage capacities imply high costs.

DISCLOSURE OF THE INVENTION

Scope of the present invention is to provide a power production system, a power plant and a method for managing a power production system that overcomes at least one of the aforementioned drawbacks. This scope is achieved by the power production system, the power plant and the method according to the appended claims.

The present disclosure relates to a power production system. The power production system (in the following: "the system") comprises a hydraulic turbine; the hydraulic turbine is installable in a penstock or at one end of a penstock and is rotatable in a first rotation direction by effect of a flow of fluid (in particular, water) flowing in the penstock in a downward direction. In particular, the penstock has a first end and a second end, opposite to the first end, wherein the second end has lower elevation than the first end. So, the downward direction is defined from the first end to the second end. Also, preferably, the hydraulic turbine is a reversible pump/turbine and is rotatable also in a second rotation direction opposite to the first rotation direction (when acting as a pump).

In particular, the turbine includes an impeller (or impeller rotor), which is rotatable in the first rotation direction and, preferably, also in the second rotation direction.

The system comprises an energy converter group. The energy converter group is connected to the hydraulic turbine. The energy converter group may include a generator, or alternator, configured to receive input mechanical power from the turbine and generate output electrical power.

The energy converter group may include an electrical motor, configured to absorb input electrical power and to generate output mechanical power to move the turbine. In an embodiment, the energy converter group includes an electrical machine operable both as a motor and as a generator.

The system comprises an accumulator (or storage unit). The accumulator is connected to the energy converter group.

The system comprises a control unit.

The control unit may be connected to the energy converter group and to the accumulator. The control unit is configured to operate the system in a power generation mode, in which the energy converter group receives an input mechanical power from the hydraulic turbine rotating in the first rotation direction by effect of the flow of fluid and generates an output electrical power. The energy converter group, in the power generation mode of the system, supplies said output electrical power to an external grid and/or to the accumulator. In particular, the control unit may be configured to control the energy converter group so that it supplies at least a part of the output electrical power to the accumulator until the accumulator has been fully charged and, after the accumulator has been fully charged, it supplies the output electrical power to the external grid. Hence, in the power generation mode, the energy converter group functions as a generator.

The control unit may be configured to operate the system in a downward pushing mode, in which the energy converter group absorbs an input electrical power from the accumulator and generates an output mechanical power to move the hydraulic turbine (in particular, the impeller). Hence, in the downward pushing mode, the energy converter group functions as a motor. In the downward pushing mode, the energy converter group is configured to drive the hydraulic turbine (in particular, the impeller) in said first rotation direction. In other words, in the downward pushing mode the energy converter group is configured to make the hydraulic turbine rotate in the first rotation direction. Hence, in said downward pushing mode, the hydraulic turbine (in particular, the impeller) is rotatable in the first rotation direction by effect of the energy converter group; the power provided to the turbine (in particular, the impeller) causes an acceleration of the flow of fluid flowing in the penstock in the downward direction. So, the time required for the fluid flowing in the penstock to accelerate till a target flow rate is shortened.

Preferably, the control unit is configured to receive a signal representative of a grid request and to set the system in the downward pushing mode, responsive to said signal. Preferably, said signal is sent by the Transmission System Operator or the Independent System Operator or another entity managing the grid (in the following: "TSO"). Hence, when the TSO detects a sudden unbalance in the power system, it sends to the control unit a signal representative of a request to increase the output power, to restore the load balance. In such a way, the TSO prevents or at least dampens frequency or voltage drops of the grid.

Preferably, said signal includes a target output power and/or a time limit within which said target output power has to be supplied to the external grid. In a possible embodiment, said signal includes a request to increase the output power until a certain percentage of a certain target value within a first time limit, and a hundred percent of the target value, within a second time limit. Preferably, said signal includes a time period during which said target power has to be (continuously) supplied to the external grid. For example, said signal may include a request to increase the output power until half of the target output power value within 300 ms, to further increase until the target output power value within 1 second, and to maintain the target output power value for 10 minutes.

In an embodiment, said signal is representative of a frequency of the grid. In an embodiment, the control unit may be configured to receive an actual value of the frequency of the grid and activate the downward pushing mode responsive to the frequency of the grid decreasing below a reference value.

In another possible embodiment, the downward pushing mode could be activated manually by an operator. The operator may activate the downward pushing mode in response to a message received by the TSO.

In an embodiment, the system comprises a sensor configured to detect a flow signal representative of a flow rate of the fluid flowing in the penstock. Said sensor may be a flow rate sensor such as a pressure gauge coupled to the penstock. In an embodiment, the control unit is configured to maintain the system in the downward pushing mode until the flow rate detected by the sensor reaches a predetermined value. Said predetermined value is related to the target output power to be supplied at regime; in other words, said predetermined value is the value that allows to set the system in the power generation mode and supply the target power.

Hence, the downward pushing mode is used to let the fluid reach the regime flow rate quicker; once the regime flow rate has been reached, the system is set in the power generation mode to generate output power from the rotation of the turbine.

In an embodiment, the system comprises an inverter connected between the accumulator and the energy converter group, wherein, in said downward pushing mode, the inverter is configured to receive a direct current from the accumulator and supply an alternate current to the energy converter group. It is noted that the inverter may also function as a rectifier, when it receives an alternate current to the energy converter group and supplies a direct current to the accumulator. In this light, the inverter is here intended as an inverter-rectifier component. In an embodiment, the control unit is configured to maintain the system in the downward pushing mode until the input electrical power supplied from the accumulator to the energy converter group reaches a maximum value related to the inverter. In particular, the maximum value is a function of the power rating of the inverter.

In an embodiment, the control unit is configured to maintain the system in the downward pushing mode until the flow rate detected by the sensor reaches a predetermined value or the input electrical power supplied from the accumulator to the energy converter group reaches a maximum value allowed by the inverter (or a combination of the maximum value allowed by the inverter and a maximum duration for said value), whichever condition is verified first. Indeed, an inverter is normally designed to withstand its maximum nominal power for extensive operation, or to withstand increasingly higher powers for increasingly shorter periods. Operation at higher-than-nominal power may negatively impact the durability of the inverter and other electrical equipment. Preferably, the control unit is configured to minimize the adverse effects of operation of the electrical equipment at higher-than-nominal power.

In an embodiment, a rotational speed sensor is provided in the system, to measure the rotational speed of the turbine.

In an embodiment, in the downward pushing mode, the control unit is configured to control the accumulator so that the accumulator, further to supplying said input electrical power to the energy converter group, supplies a grid electrical power to the external grid. So, during operation of the system in the downward pushing mode, the accumulator is discharged both to further accelerate the fluid in the downward direction and to supply electrical power to the grid. In such a way, compared to a system wherein the accumulator is only used to supply electrical power to the grid while the fluid flowing downward is accelerated only by the effect of the gravity (i.e., the hydrostatic pressure), the regime rotational power is reached quicker and less accumulator capacity is required. In fact, while some of the energy from the accumulator is employed to induce a downward acceleration in the fluid flow which is higher than the natural acceleration of the fluid in the penstock, the energy required to further accelerate the fluid is less than the energy spared thanks to the fact that the nominal regime is reached more quickly. This is due to the fact that most of the downward accelerating effect is obtained while the fluid has a small flow rate and thus a limited work is required.

Hence, the downward pushing mode is useful to provide grid services such as Fast Frequency Response and Synthetic Inertia. In fact, when a fast increase in the output power to be supplied to the grid is required, a regulating valve (possibly, a regulating distributor acting as shutoff valve) which allows the fluid to flow in the penstock, is opened and, during the time the fluid takes to accelerate in the penstock, the turbine is actively driven by the energy converter group. This causes a downward acceleration of the fluid in the penstock that is higher than the natural acceleration of the fluid. So, the turbine reaches a turbine target speed in a shorter time and the fluid in the penstock also reaches a fluid target flow rate in a shorter time; after the turbine has reached the target speed and the fluid has reached a fluid target flow rate, the control unit sets the system in the power generation mode to generate the power demanded from the grid. Hence, thanks to the active acceleration of the turbine and, so, of the fluid, using the energy stored in the accumulator, the system is ready to supply said power to the grid more quickly.

In an embodiment, the control unit is further configured to operate the system in a normal (or upward) pumping mode, in which the energy converter group absorbs an additional input electrical power from the external grid and/or from the accumulator, and generates an additional output mechanical power to drive the hydraulic turbine (in particular, the impeller) in a second rotation direction opposite to the first rotation direction, to make the fluid in the penstock to flow in the upward direction, opposite to the downward direction. Hence, the power production system may be coupled to a pumped storage plant wherein during periods of high electric load and/or high electricity prices and/or low energy production the fluid flows in the downward direction and the system is operated in the power generation mode, while during periods of low electric load and/or low electricity prices and/or high energy production the system is operated in the normal (or upward) pumping mode and the fluid flows in the upward direction. Moreover, it is provided that, while the system is operated in the power generation mode, at a power level lower than the maximum power level the control unit may set the downward pushing mode to more quickly respond to sudden increases in the electricity demand. Generally speaking, the system is operated in the downward pushing mode for a limited amount of time, necessary for the turbine to reach the regime rotational speed and/or for the fluid to reach a fluid target flow rate.

Preferably, the hydraulic turbine is an axial flow turbine. For axial flow turbine it is meant a turbine wherein the flow of the fluid is mainly directed parallel to a shaft of the turbine. For example, the turbine may be a Kaplan turbine. The axial flow turbines are able to provide energy to the fluid by pumping both in the upward and the downward directions. Therefore, these axial flow turbines are suitable for the system to be operated in the power generation mode, in the normal pumping mode and in the downward pushing mode. It is observed that the blade profile can be optimized considering the velocity triangles resulting from the power generation mode and the normal pumping mode; however, they may reach a reasonable efficiency also in the downward pushing mode. Furthermore, it is acceptable to have a limited efficiency in the downward pushing mode, and in certain applications it is also acceptable to incur in cavitation phenomena, since the downward pushing mode is activated only for a short amount of time, to supply said grid services.

Preferably, the accumulator includes supercapacitors (or ultracapacitors). The supercapacitors involve a high C-rating (i.e. short discharge time), which is particularly suitable for providing large amounts of power for very short times (e.g. few seconds or tens of seconds). In another embodiment, the accumulator includes a plurality of batteries, for example Li-ion batteries.

The present disclosure also relates to a power plant comprising said power production system. The power plant further comprises at least a first reservoir and a penstock. The penstock has a first end connected to the first reservoir and a second end opposite to the first end, the second end having a lower elevation (or altitude) than the first end. The hydraulic turbine is coupled to the penstock between the first end and the second end.

The plant may further comprise a second reservoir connected to the second end of the penstock. The second reservoir has a lower elevation (or altitude) than the first reservoir elevation (or altitude).

Preferably, the penstock has an equivalent (or average) slope in the range from 5% to 50%, more preferably in the range 10% to 30%. In fact, the downward pushing mode is particularly useful when the penstock has a mild slope, in which case the fluid takes a long time to accelerate and reach the nominal flow rate.

The system (or the plant) comprises at least one shutoff valve. The shutoff valve is configured to control a flow of fluid in the penstock. In particular, the shutoff valve has an open position to allow the fluid to flow in the penstock in the downward direction and a closed position to block the fluid from flowing in the penstock. Also, the shutoff valve may allow the fluid to flow in the penstock in the upward direction. The system (or the plant) comprises a regulating distributor to optimally guide the flow towards the turbine. Preferably, the distributor has regulating blades to adapt to the different operating regimes in power generation mode, in normal pumping mode, and in downward pushing mode. Preferably, the shutoff valve and the regulating distributor are the same component. In other words, the regulating blades of the distributors are adopted to control the flow of fluid in the fluid in the penstock.

The shutoff valve may be controlled by the control unit. In particular, if the system is off (no power generated nor absorbed, shutoff valve in the closed position) and it receives said signal, the control unit opens the shutoff valve to allow the fluid to flow in the penstock and, simultaneously, sets the system in the downward pushing mode until the fluid has reached the predefined (regime) downward flow rate.

Also, the regulating blades of the distributor may be controlled by the control unit. In particular, during the downward pushing mode operation, the control unit regulates the opening angle of the regulating blades of the distributor continuously (namely, in real time), according to a predetermined set of values, depending on the readings of the flow rate sensor and the rotational speed sensor, to maximize the effectiveness of the downward fluid acceleration.

Also, if the control unit is operating the system in the power generation mode at a power level lower than the maximum power level and receives said signal, it commands a variation in the opening angle of the regulating blades of the distributor to increase the fluid flow in the penstock and, simultaneously, sets the system in the downward pushing mode, until the flow rate has reached the predefined (regime) value, corresponding to the requested increased output power.

The power plant may comprise said fluid (which defines a working fluid). Said fluid has a first density. In an embodiment, the second reservoir is operatively immersed into an environmental fluid having a second density different from the first density; also the penstock is at least partially operatively immersed in said environmental fluid. A plant according to this embodiment is also called of submerged type. In particular, the environmental fluid may be freshwater or salty water of a basin; the second reservoir is submerged in the basin; the first reservoir may be placed outside the basin or floating on the basin or at least partially submerged in the basin at a different height than the second reservoir. The fluid may be one of the following substances: freshwater, salty water, aqueous electrolyte solutions of solutes including inorganic salts, organic salts and acids; non-electrolyte solutions including glucose, sucrose, ethanol colloids and suspensions including muddy water and emulsions.

The first density is preferably greater than the second density. In particular, a difference between the first density and the second density may be about 200 kg/m$^3$; this means that, even for a vertical penstock, the working fluid is subject to a gravity acceleration similar to the one of a fluid flowing in a traditional penstock with mild slope; hence, even in such a type of plant of submerged type, the downward pushing mode may be advantageously employed.

A plant according to this embodiment (namely, of submerged type) is further detailed in Italian patent document having application Ser. No. 102019000022917, in the name of the same Applicant. It is here explicitly intended that all the features of the power plant of Italian patent document 102019000022917 may be applied to the power plant according to this embodiment.

The present disclosure also relates to a method for managing a power production system. The power production system is obtained according to one or more of the aspects of the present disclosure. The method comprises a step of operating the system in power generation mode, in which the energy converter group receives an input mechanical power from the hydraulic turbine rotating in a first rotation direction by effect of a fluid flowing in the penstock in a downward direction, wherein the energy converter group generates an output electric power and supplies said output electrical power to an external grid and/or to the accumulator.

The method also comprises a step of operating the system in a downward pushing mode, in which the energy converter group absorbs an input electrical power from the accumulator and generates an output mechanical power to drive the hydraulic turbine in the downward pushing mode. In said downward pushing mode, the energy converter group provides power to the hydraulic turbine to drive it (or make it rotate) in said first rotation direction. So, the hydraulic turbine is rotated by effect of the energy converter group; the rotation of the turbines accelerates the flow of fluid flowing in the penstock in the downward direction. In other words, the downward pushing mode allows for the turbine to actively push the fluid in the downward direction.

Preferably, the downward pushing mode is activated by a control unit responsive to a signal representative of a grid request; the downward pushing mode is maintained active until the downward fluid flow reaches a predefined (regime) flow rate. After that, the control unit sets the system in the power generation mode, to perform said step of operating the system in the power generation mode.

The method may also comprise a step of operating the system in a normal (or traditional) pumping mode, in which the energy converter group absorbs an additional input electrical power from the external grid and/or from the accumulator and generates an additional output mechanical power to drive the hydraulic turbine in the second rotation direction opposite to the rotation first direction, to make the fluid in the penstock to flow in the upward direction, opposite to the downward direction.

In an embodiment, in the downward pushing mode, the accumulator further to supplying said input electrical power to the energy converter group supplies an additional output electrical power to the external grid.

BRIEF DESCRIPTION OF DRAWINGS

This and other features of the invention will become more apparent from the following detailed description of a preferred, non-limiting example embodiment of it, with reference to the accompanying drawing, in which:

FIG. 2 schematically illustrates the operation of a prior art power plant wherein an accumulator is employed only to directly provide power to the grid while the fluid accelerates in the penstock by effect of gravity;

FIGS. 3-5 illustrate possible operations of the power plant according to the present disclosure, wherein the accumulator is employed both to directly provide power to the grid and to actively accelerate the turbine, so to reduce the time for the fluid to reach a nominal flow rate;

FIG. 6 illustrates a further operation of the power plant according to the present disclosure, wherein the accumulator is only employed to actively accelerate the turbine, so to reduce the time for the fluid to reach the nominal flow rate.

DETAILED DESCRIPTION OF PREFERRED EMBODIMENTS OF THE INVENTION

Figure 1:
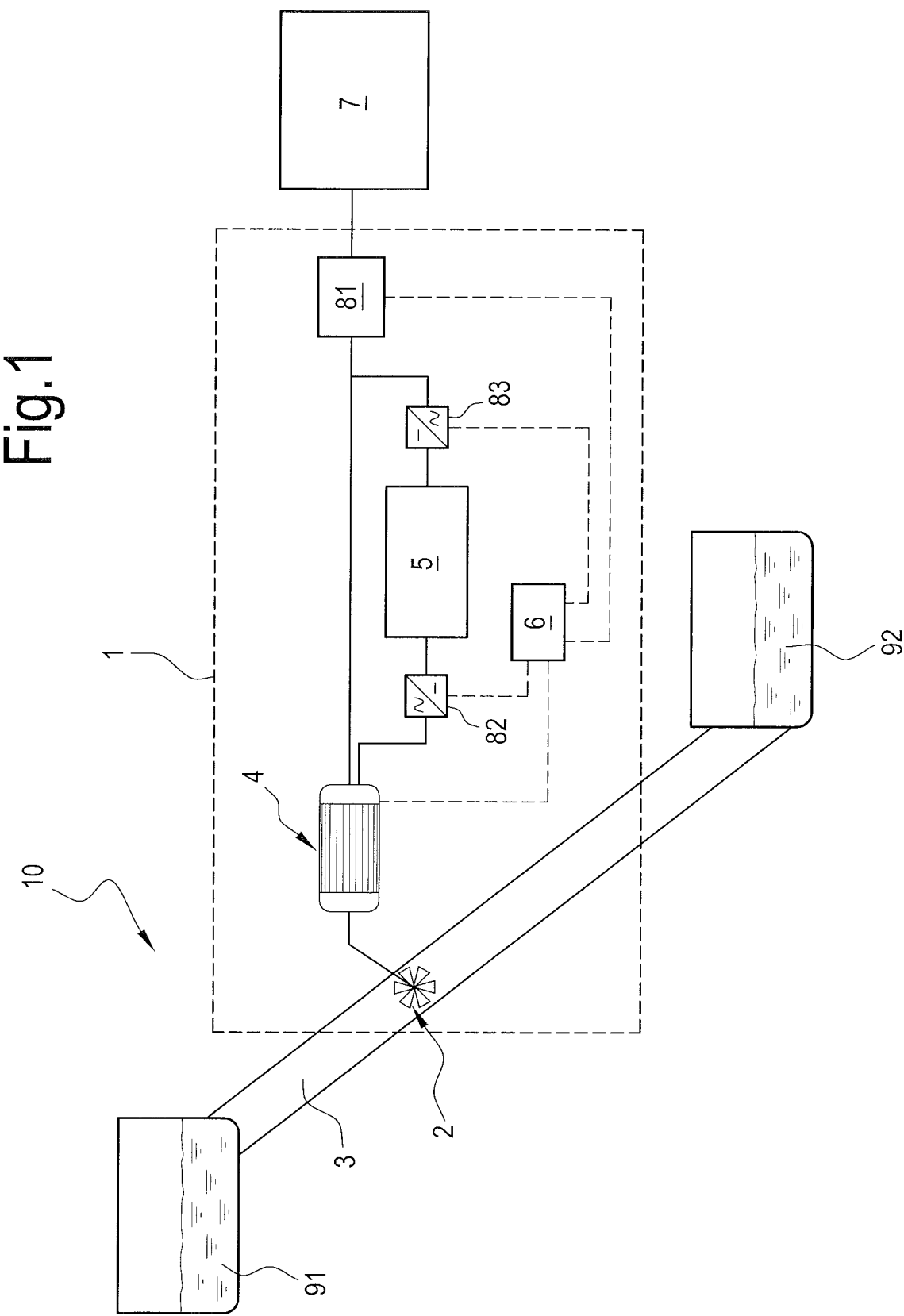
FIG. 1 schematically illustrates a power plant comprising a power production system according to the present disclosure.

With reference to the accompanying drawings, the numeral 10 denotes a power plant. The power plant 10 comprises a first reservoir (or higher reservoir) 91 and a second reservoir (or lower reservoir) 92. The first reservoir 91 is at a higher altitude than the second reservoir 92. The power plant 10 comprises a penstock 3. The penstock 3 connects the first reservoir 91 to the second reservoir 92.

The power plant 10 comprises a power production system 1. The power production system 1 comprises a hydraulic turbine 2, preferably of the axial flow type, mounted along the penstock 3. The power production system 1 comprises an energy converter group 4, connected to the turbine 2. The energy converter group 4 may function both as a motor, to drive the turbine 2, and as a generator, to generate electrical power upon receiving rotational movement from the turbine 2.

The power production system 1 comprises an accumulator or storage unit connected to the energy converter group 4. The energy converter group 4 and the accumulator 5 are further connected to an external transmission grid 7.

In particular, the system 1 comprises a transformer 81, connected between the energy converter group 4 and the grid 7. The transformer 81 is configured to receive from the energy converter group 4 an alternate current having a first voltage and supply to the grid 7 an alternate current having a second voltage. Preferably, the transformer 81 is bidirectional, so that it is also configured to receive from the grid 7 electric power at the second voltage and supply to the energy converter group electric power at the first voltage.

The system 1 further comprises a first rectifier-inverter 82, connected between the energy converter group 4 and the accumulator 5; the first rectifier-inverter 82 is configured to receive an alternate current from the energy converter group 4 and transform it into a direct current to be supplied to the accumulator; also, the first rectifier-inverter 82 is configured to receive a direct current from the accumulator 5 and transform it into an alternate current to be supplied to the energy converter group 4. Also, the first rectifier-inverter 82 is configured to supply the energy converter group 4 with variable frequency in order to regulate the rotational speed of the turbine. It is observed that this rectifier-inverter 82 has to be dimensioned so to allow the accumulator 5 to power the energy converter group 4 in the downward pushing mode; hence, this rectifier-inverter 82 has to be over-dimensioned with respect to a solution wherein the downward pushing mode is not provided.

The system further comprises a second rectifier-inverter 83, connected between the accumulator 5 and the grid 7.

The system 1 comprises a distributor with regulating blades (not illustrated), configured to control a flow of fluid in the penstock 3.

The system 1 comprises a control unit 6. The control unit 6 is configured to operate the system 1 in a power generation mode, wherein:

the distributor allows the fluid to flow in the penstock 3 in a downward direction, from the first reservoir 91 to the lower reservoir 92;

the turbine 2 rotates in a first rotation direction, by effect of the flow of fluid;

the distributor regulating blades are opened at the optimal angle to optimally direct the flow towards the turbine to maximize the energy conversion efficiency at the selected operating regime;

the energy converter group 4 works as a generator to transform the rotational movement of the turbine 2 into electrical power;

the produced electrical power is supplied to the accumulator 5 and/or to the grid 7.

The control unit 6 is configured to operate the system 1 in a downward pushing mode, wherein:

the distributor allows the fluid to flow in the penstock 3 in a downward direction, from the first reservoir 91 to the lower reservoir 92;

distributor regulating blades are continuously regulated at the optimal angles depending on the values of the flow rate and on the turbine rotational speed from the sensors, to optimally direct the flow towards the turbine to maximize the effectiveness of the downward flow acceleration;

the energy converter group 4 works as a motor to drive the turbine 2 in the first rotational direction, so that the turbine 2 is driven by the motor and the fluid in the penstock 3 is accelerated by the turbine;

the energy converter group 4 absorbs power from the accumulator to drive the turbine 2.

In an embodiment, in the downward pushing mode, the accumulator also supplies power to the external grid.

In an embodiment, the control unit 6 is configured to operate the system 1 in a pumping mode, wherein:

the distributor allows the fluid to flow in the penstock 3 in the upward direction, from the lower reservoir 92 to the first reservoir 91;

the distributor regulating blades are opened at the optimal angle to optimally direct the flow towards the turbine to maximize the energy conversion efficiency at the selected operating regime;

the energy converter group 4 works as a motor to drive the turbine 2 in the second rotational direction, opposite to the first rotational direction;

the energy converter group 4 absorbs power from the accumulator and/or from the grid 7, to drive the turbine 2.

The advantages provided by the downward pushing mode will be more apparent by the following description of possible examples of operation of the system.

In particular, with reference to FIGS. 2-6, it is represented on a first vertical axis the power P supplied by the turbine over time. On a second vertical axis it is represented the flow rate F of the fluid flowing in the penstock, over time.

FIG. 2 illustrates operation of a prior art system. Starting from a switched off configuration, at time to the system receives a grid request representative of a request to increase the output power till a nominal (or regime) power NP. The distributor is opened so that the fluid starts accelerating under the sole effect of gravity. While the fluid is accelerating (so, the flow rate is increasing), the accumulator is employed to provide energy to the grid. The output power from the accumulator to the grid is represented with a dashed line; it is indicated with E2 the energy supplied from the accumulator directly to the grid. It is here assumed that the accumulator immediately provides the grid with the same power as the nominal power NP requested by the grid, and that it is switched off at time $t_1$, which is the time when the flow rate F reaches a nominal flow value NF, at which point the turbine is able to provide the nominal power NP to the grid.

FIG. 3 illustrates an example of operation of the system according to the present disclosure. Starting from a switched off configuration, at time to the system receives a grid request representative of a request to increase the output power till a nominal (or regime) power NP. While the fluid is accelerating due to gravity, the system is operated in the downward pushing mode; in particular the accumulator is employed both to further accelerate the flow in the penstock and to provide energy to the grid. As a result, the flow rate F increases more rapidly than in the prior art system. Hence, the duration of time between $t_0$ and $t_1$ (which is the time at which the flow rate F reaches the nominal flow value NF) is reduced. Hence, at time $t_1$, the turbine is switched in the power generation mode in which the turbine provides the nominal power NP to the grid. Again, E1 indicates the energy supplied from the accumulator to the turbine and so, to the fluid in the downward pushing mode; E2 indicates the energy provided from the accumulator directly to the grid; E3 indicates the energy provided from the fluid to the grid in the power generation mode. In particular, enough power is given to the turbine to generate a pressure difference that is the same as the hydrostatic (or gravitational) one in the penstock, which halves the time needed to reach the nominal flow rate. This allows to spare 25% of energy needed from the accumulator (namely, the sum of E1 plus E2), compared to the prior art.

FIG. 4 illustrates a further example of operation of the system according to the present disclosure. Like in the example of FIG. 3, part of the energy from the accumulator is used to provide energy E2 to the grid, and another part is used to provide energy E1 to accelerate the flow in the penstock. In particular, enough power is given to the turbine to generate a pressure difference that is twice the hydrostatic (or gravitational) one in the penstock, which reduces by 3 times the time needed to reach the nominal flow rate. This allows to spare 33% of the energy needed from the accumulator compared to the prior art. However, it requires providing up to twice the nominal power to the turbine, which in turns requires over-dimensioning the electric components (in particular, the inverter 82 and the energy converter group 4).

FIG. 5 illustrates a further example of operation of the system according to the present disclosure. Like in the examples of FIGS. 3 and 4, part of the energy from the accumulator is used to provide energy E2 to the grid, and another part is used to provide energy E1 to accelerate the flow in the penstock. In particular, enough power is given to the turbine to generate a pressure difference that is three times the hydrostatic (or gravitational) one in the penstock. In this case, the downward pushing mode is maintained only till time $t_1'$, which is the time at which the power supplied from the accumulator to the turbine reaches (in absolute value) the nominal power of the turbine. In other words, $t_1'$ is the time at which e.g. the inverter reaches its maximum power. In this case, it is not necessary to over-dimension the electric components (such as the inverter). This solution allows to spare approximately 40% of energy from the accumulator, compared to the prior art.

FIG. 6 illustrates a further example of operation of the system according to the present disclosure. In this case, no energy from the accumulator is used to provide energy to the grid. The accumulator is only used to accelerate the flow in the penstock. In particular, enough power is used to halve the time needed to reach the nominal flow rate.

The invention claimed is:

1. A power production system (1), comprising:
   a hydraulic turbine (2), mountable along a penstock (3) and being rotatable in a first rotation direction by effect of a flow of fluid flowing in the penstock (3) in a downward direction;
   an energy converter group (4), connected to the hydraulic turbine (2);
   an accumulator (5), connected to the energy converter group (4);
   a control unit (6), configured to operate the system (1) in a power generation mode, in which the energy converter group (4) receives an input mechanical power from the hydraulic turbine (2) rotating in the first rotation direction by effect of the flow of fluid, generates an output electrical power and supplies said output electrical power to an external grid (7) and/or to the accumulator (5),
   characterized in that the control unit (6) is further configured to operate the system (1) in a downward pushing mode, in which the energy converter group (4) absorbs an input electrical power from the accumulator (5) and generates an output mechanical power to drive the hydraulic turbine (2),
   wherein, in the downward pushing mode, the energy converter group (4) is configured to provide power to the hydraulic turbine (2) to drive it in said first rotation direction,
   wherein the control unit (6) is configured to receive a signal representative of a grid reserve request and to set the system (1) in the downward pushing mode, responsive to said signal, and
   wherein said signal includes a target output power and a time limit within which said target output power has to be supplied to the external grid (7).

2. The power production system (1) according to claim 1, comprising a first inverter (82) connected between the accumulator (5) and the energy converter group (4), wherein, in said downward pushing mode, the first inverter (82) is configured to receive a direct current from the accumulator (5) and supply an alternate current to the energy converter group (4), wherein the control unit (6) is configured to maintain the system (1) in the downward pushing mode until the input electrical power supplied from the accumulator (5) to the energy converter group (4) reaches a maximum value related to the first inverter (82) or other electric equipment.

3. The power production system (1) according to claim 1, wherein the hydraulic turbine (2) is an axial flow turbine.

4. The power production system (1) according to claim 1, further comprising:
   a second inverter (83) connected between the accumulator (5) and the external grid (7);
   wherein, in the downward pushing mode, the control unit (6) is configured to control the second inverter (83) so that the accumulator (5), in addition to supplying said input electrical power to the energy converter group (4), supplies an additional output electrical power to the external grid (7).

5. The power production system (1) according to claim 1, wherein the control unit (6) is further configured to operate the system (1) in a pumping mode, in which the energy converter group (4) absorbs an additional input electrical power from the external grid (7) and/or from the accumulator (5), and generates an additional output mechanical power to drive the hydraulic turbine (2) in a second rotation direction opposite to the rotation first direction, to make the fluid in the penstock (3) to flow in an upward direction, opposite to the downward direction.

6. The power production system (1) according to claim 1, wherein the accumulator (5) includes supercapacitors.

7. A power plant (10) comprising:
   the power production system (1) according to claim 1;
   a first reservoir (91);
   wherein the penstock (3) has a first end connected to the first reservoir (91) and a second end opposite to the first end, the second end having a lower height than the first end, wherein the hydraulic turbine (2) is associated to the penstock (3) between the first end and the second end.

8. The power plant according to claim 7, comprising a second reservoir (92) connected to the second end of the penstock (3), the second reservoir (92) having a lower height with respect to the first reservoir (91).

9. A power production system (1), comprising:
   a hydraulic turbine (2), mountable along a penstock (3) and being rotatable in a first rotation direction by effect of a flow of fluid flowing in the penstock (3) in a downward direction;
   an energy converter group (4), connected to the hydraulic turbine (2);
   an accumulator (5), connected to the energy converter group (4);
   a control unit (6), configured to operate the system (1) in a power generation mode, in which the energy converter group (4) receives an input mechanical power from the hydraulic turbine (2) rotating in the first rotation direction by effect of the flow of fluid, generates an output electrical power and supplies said output electrical power to an external grid (7) and/or to the accumulator (5), and
   a sensor configured to detect a flow signal representative of a downward flow rate of the fluid flowing in the penstock (3) in the downward direction,
   characterized in that the control unit (6) is further configured to operate the system (1) in a downward pushing mode, in which the energy converter group (4) absorbs an input electrical power from the accumulator (5) and generates an output mechanical power to drive the hydraulic turbine (2), wherein, in the downward pushing mode, the energy converter group (4) is configured to provide power to the hydraulic turbine (2) to drive it in said first rotation direction,
   wherein the control unit (6) is configured to maintain the system (1) in the downward pushing mode until the downward flow rate detected by the sensor reaches a predetermined value.

10. The power production system (1) according to claim 9, wherein the control unit (6) is configured to receive a signal representative of a grid reserve request and to set the system (1) in the downward pushing mode, responsive to said signal.

11. The power production system (1) according to claim 10, wherein said signal includes a target output power and a time limit within which said target output power has to be supplied to the external grid (7).

12. The power production system (1) according to claim 9, wherein the hydraulic turbine (2) is an axial flow turbine.

13. The power production system (1) according to claim 9, further comprising:
   a second inverter (83) connected between the accumulator (5) and the external grid (7);
   wherein, in the downward pushing mode, the control unit (6) is configured to control the second inverter (83) so that the accumulator (5), in addition to supplying said input electrical power to the energy converter group (4), supplies an additional output electrical power to the external grid (7).

14. The power production system (1) according to claim 9, wherein the control unit (6) is further configured to operate the system (1) in a pumping mode, in which the energy converter group (4) absorbs an additional input electrical power from the external grid (7) and/or from the accumulator (5), and generates an additional output mechanical power to drive the hydraulic turbine (2) in a second rotation direction opposite to the rotation first direction, to make the fluid in the penstock (3) to flow in an upward direction, opposite to the downward direction.

15. The power production system (1) according to claim 9, wherein the accumulator (5) includes supercapacitors.

16. A power plant (10) comprising:
the power production system (1) according to claim 5;
a first reservoir (91);
wherein the penstock (3) has a first end connected to the first reservoir (91) and a second end opposite to the first end, the second end having a lower height than the first end, wherein the hydraulic turbine (2) is associated to the penstock (3) between the first end and the second end.

17. A method for managing a power production system (1), wherein the power production system (1) comprises a hydraulic turbine (2), mountable along a penstock (3), an energy converter group (4), an accumulator (5) and a control unit (6), wherein the method comprises the following steps:
operating the system (1) in power generation mode, in which the energy converter group (4) receives an input mechanical power from the hydraulic turbine (2) rotating in a first rotation direction by effect of a fluid flowing in the penstock (3) in a downward direction, wherein the energy converter group (4) generates an output electric power and supplies said output electrical power to an external grid (7) and/or to the accumulator (5),
characterized in that the method comprises as step of operating the system (1) in a downward pushing mode, in which the energy converter group (4) absorbs an input electrical power from the accumulator (5) and generates an output mechanical power to drive the hydraulic turbine (2),
wherein, in the downward pushing mode, the energy converter group (4) provides power to the hydraulic turbine (2) to drive it in said first rotation direction, so that the hydraulic turbine (2) is driven in said first rotation direction by effect of the energy converter group (4) and provides acceleration to the flow of fluid in the downward direction,
wherein the control unit (6) is configured to receive a signal representative of a grid reserve request and to set the system (1) in the downward pushing mode, responsive to said signal, and
wherein said signal includes a target output power and a time limit within which said target output power has to be supplied to the external grid (7).

18. The method according to claim 17, wherein, in said downward pushing mode, the accumulator (5), in addition to supplying said input electrical power to the energy converter group (4), supplies an additional output electrical power to the external grid (7).

19. The method according to claim 17, wherein said fluid flowing in the penstock (3) has a first density, wherein the penstock (3) connects a first reservoir (91) to a second reservoir (92) having a lower elevation with respect to the first reservoir (91), and wherein second reservoir (92) is operatively immersed into an environmental fluid having a second density different from the first density, and the penstock (3) is at least partially operatively immersed in said environmental fluid.

\* \* \* \* \*